United States Patent [19]

Kratz et al.

[11] 4,151,561

[45] Apr. 24, 1979

[54] ADJUSTABLE YOKE MOUNTING FOR IN-LINE BEAM COLOR TELEVISION PICTURE TUBE

[75] Inventors: Jerrold K. Kratz; Edward W. Christensen, II, both of Indianapolis, Ind.

[73] Assignee: RCA Corporation, New York, N.Y.

[21] Appl. No.: 804,005

[22] Filed: Jun. 6, 1977

[30] Foreign Application Priority Data

Jul. 6, 1976 [GB] United Kingdom ............... 28056/76

[51] Int. Cl.[2] ............................................... H04N 9/28

[52] U.S. Cl. ...................................... 358/248; 335/210

[58] Field of Search ................ 335/212, 210; 358/248, 358/249

[56] References Cited

U.S. PATENT DOCUMENTS

| | | | |
|---|---|---|---|
| 3,302,050 | 1/1967 | Obert et al. | 358/248 |
| 3,404,228 | 10/1968 | McLeod, Jr. et al. | 358/248 |
| 3,602,853 | 8/1971 | Cummings et al. | 358/248 |
| 3,629,751 | 12/1971 | Massa | 358/248 |
| 3,697,909 | 10/1972 | Christensen et al. | 358/248 |
| 3,921,110 | 11/1975 | Ishii et al. | 358/248 |
| 4,006,301 | 2/1977 | Bubacz et al. | 335/212 |

*Primary Examiner*—Robert L. Griffin
*Assistant Examiner*—Joseph A. Orsino, Jr.
*Attorney, Agent, or Firm*—Eugene M. Whitacre; Paul J. Rasmussen; Robert L. Troike

[57] ABSTRACT

An adjustable yoke mount for a deflection yoke of the type including a funnel shaped insulator having a large annular insulator flange at the front or screen end of the yoke and smaller insulator flange at the opposite or back end is provided by mounting the front end of the yoke to the flared portion of the in-line beam picture tube to pivot about a point near the front end of said yoke. The opposite or back end of the yoke is adjustably mounted in the plane generally orthogonal to the tube axis to tilt the yoke about the pivot point when adjusting for convergence.

10 Claims, 6 Drawing Figures

ADJUSTABLE YOKE MOUNTING FOR IN-LINE BEAM COLOR TELEVISION PICTURE TUBE

BACKGROUND OF THE INVENTION

This invention relates to an adjustable deflection yoke mounting for cathode ray tubes and, more particularly, to yoke mounting for in-line type multiple electron beam color picture tubes.

In color television receivers, the common type of image reproducing device is a cathode ray tube having three electron beams to selectively excite groups of phosphors capable of respectively producing light of three different colors, such as red, green and blue. Such a tube has a luminescence screen and in a common type of delta gun receiver this screen is made up of a plurality of triads of phosphor dots which are excited by respective electron beams projected through suitable placed apertures in a shadow mask located in back of the screen. The beams strike their respective phosphor dots by approaching them through different directions. One commonly employed arrangement of the electron guns, and hence the electron beams emanating therefrom, is with the blue gun located directly above the longitudinal tube axis and with the red and green guns located below this axis and respectively at opposite sides of the axis horizontally. Because of the beam arrangement relative to the longitudinal axis of the picture tube and the particular character of the deflection yoke field, there is a tendency for one raster (for example the blue raster) to be of a different width than the other two when full screen static and dynamic convergence is achieved. Misconvergence takes place at the sides of the picture when operating such tubes with large deflection angles. It was found that tilting the rear end of the yoke in the vertical plane only could help in this registration of the rasters. (See, for example Obert et al., U.S. Pat. No. 3,302,050 and Ryder et al., U.S. Pat. No. 3,582,848).

Color television picture tubes utilizing three horizontal in-line electron beams have been used to replace the delta gun tubes to simplify the apparatus required to maintain convergence. In the in-line picture tubes, the phosphor elements are in vertical strips of phosphor material and the apertures are elongated slits also extending in the vertical direction. Such vertical line phosphor element structures eliminates vertical registration problems. However, if the beams are not perfectly aligned with the center of the yoke magnetic field, the beams will not be converged on the viewing screen. In practice, the beams are not properly aligned as a rule and steps must be taken in order to align the beams with the magnetic field. This type of convergence correction in in-line type tubes is discussed in Barbin U.S. Pat. No. 3,789,258. In the Barbin patent, transverse movement of the entire yoke relative to the tube axis is taught as a means for achieving this form of convergence without requiring dynamic convergence correction apparatus. An example of apparatus for accomplishing this is described for example by Shrader in U.S. Pat. No. 3,786,185. Shrader also suggests that convergence may be achieved by generally tilting the yoke relative to the axis of the tube. No specific pivot point of tilt is discussed. In U.S. Pat. No. 3,921,110 of Ishii et al., it is suggested that the end of the yoke nearest the screen (forward end) be moved to adjust for this convergence. The pivot point in this arrangement would therefore be at or near the rear end of the yoke. According to the prior art, the yoke cannot be placed as far forward as it possibly could in order to allow space at the forward or screen end of the yoke to be translated or tilted generally in the X and Y planes (vertical and horizontal). Also, in order to make the purity adjustment, the deflection yoke must be able to be slid forward and back along the neck. This range of adjustment for purity is limited on the back end or end away from the screen by the point at which the beam strikes the neck of the tube and on the forward end (screen end) by the flare of the tube. In the past, the in-line type of tubes required relatively short yokes in order to provide the space for the purity adjustment and convergence adjustment. Short yokes, however, are less efficient and use more energy and therefore this arrangement is contrary to producing a low energy consuming television receiver.

SUMMARY OF THE INVENTION

Briefly, the above shortcomings are overcome by an adjustable yoke mounting for an in-line beam type picture tube in which the wider screen end of the yoke is mounted about the picture tube to pivot about a pivot point located near the wider end of the yoke. The rear or narrow end of the yoke is made adjustable so that when adjusting for convergence the yoke is tilted about the pivot point that lies near the wider screen end of the yoke.

DESCRIPTION OF THE INVENTION

Figure 1:
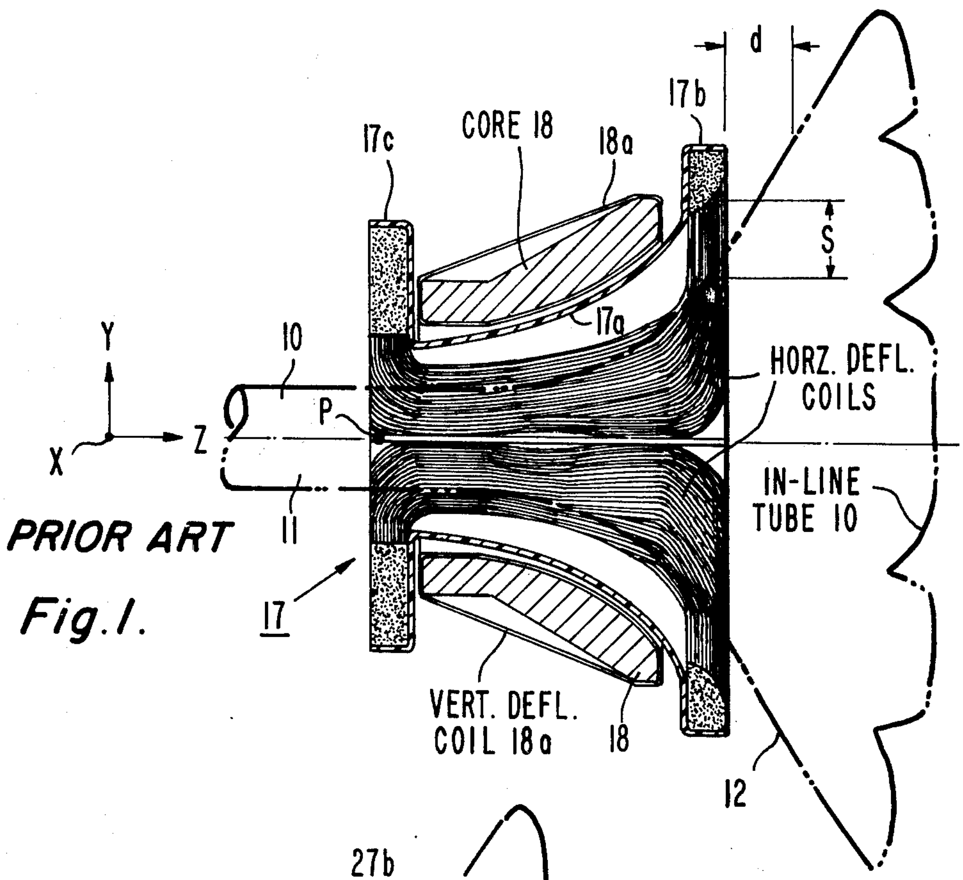
FIG. 1 is a cross sectional sketch of a deflection yoke showing the horizontal deflection coils illustrating prior art yoke mounting on in-line color television picture tubes.
Figure 2:
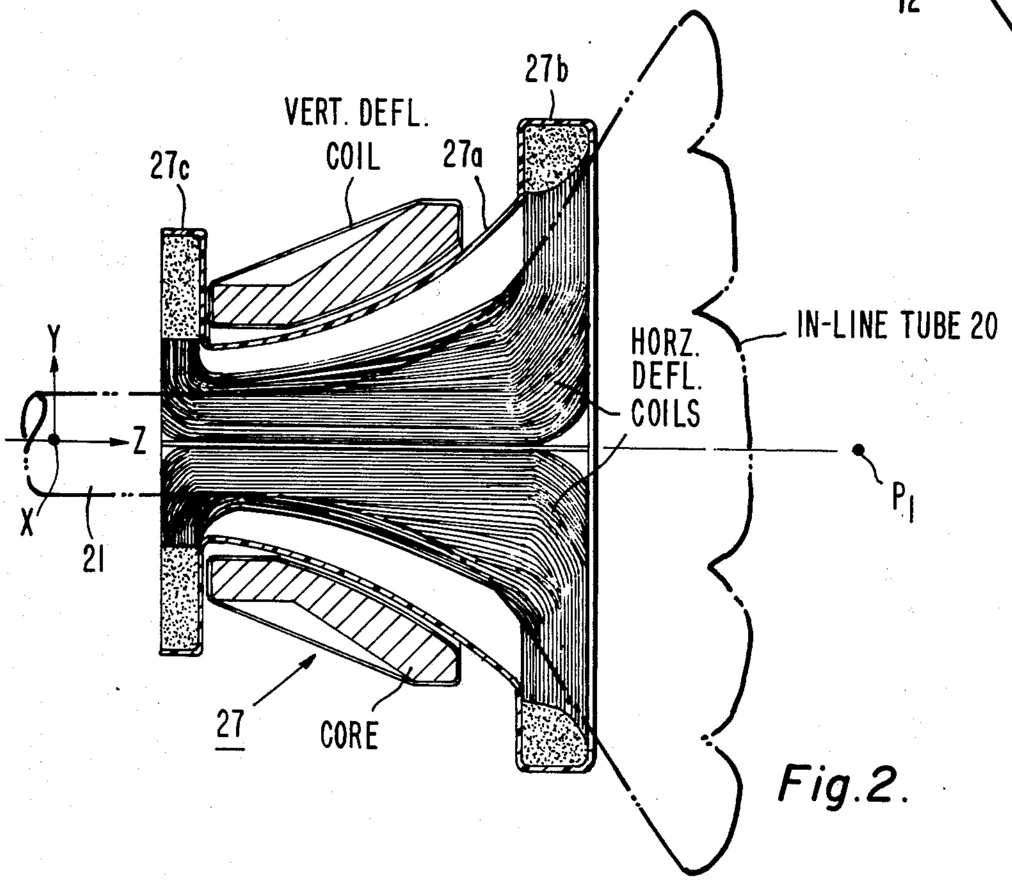
FIG. 2 is a cross sectional sketch of a deflection yoke showing the horizontal deflection coils illustrating mounting according to the present invention.

In-line color television picture tubes are color television picture tubes of the type where in the neck portion there is located an assembly for producing three in-line beams and in the phosphor screen portion there are repeated groups of blue, red and green phosphor strips disposed forward of an apertured mask. A flared envelope portion is located between the neck portion and the screen portion. Convergence adjustment for such tubes is typically provided by transverse movement of the deflection yoke relative to the neck portion and the flared portion of the tube. See Barbin U.S. Pat. No. 3,789,258. A space is required between the yoke and the tube in order to allow for this convergence adjustment movement. Referring to the prior art sketch in FIG. 1, a yoke 17 typically includes a funnel shaped insulator body 17*a* having flanged ends 17*b* and 17*c* with the body 17*a* spaced between horizontal deflection coils on the inner surface and a toroid core 18 on the outer surface. About the core 18 are the vertical deflection coils 18*a*. The space S shown in FIG. 1 between the yoke 17 and tube 10 is to allow for convergence adjustment. Also to allow space S, the yoke 17 can not be moved any closer than distance d from the flared portion 12 of the tube 10. This limits how far forward the yoke 17 can be placed. There is a limit to how far backward the yoke can be moved away from the screen before the beams when deflected strike the neck 11 of the tube. The range between how far forward and how far backward is the purity adjustment range or pullback requirement. Convergence adjustment has also been provided in the prior art by moving the forward screen flanged end 17*b* of the yoke 17 about a pivot point P located somewhere near the narrow neck 11 of the tube or in a plane at the back flanged end 17*c* of the yoke 17. Even though longer yokes are more efficient, the yokes for such tubes have been made relatively shorter than desired in order to allow the space S and d for convergence adjustment and purity adjustment. In accordance with the teaching herein the yoke can be moved more forward toward the screen of the tube 10 to thereby allow for a longer yoke and hence more efficient yoke while still have the same purity adjustment range. Basically, this is achieved as illustrated in FIG. 2 by moving the back end 27*c* of the yoke 27 in FIG. 2 in generally the orthogonal X and Y axis directions (vertical and horizontal) relative to the neck 21 of tube 20 when adjusting for convergence with the forward end 27*b* flexibly fixed to the tube so that the pivot point of the yoke 27 when making convergence adjustment is at point $P_1$ near the forward or screen end 27*b* of the yoke 27.

Figure 3:
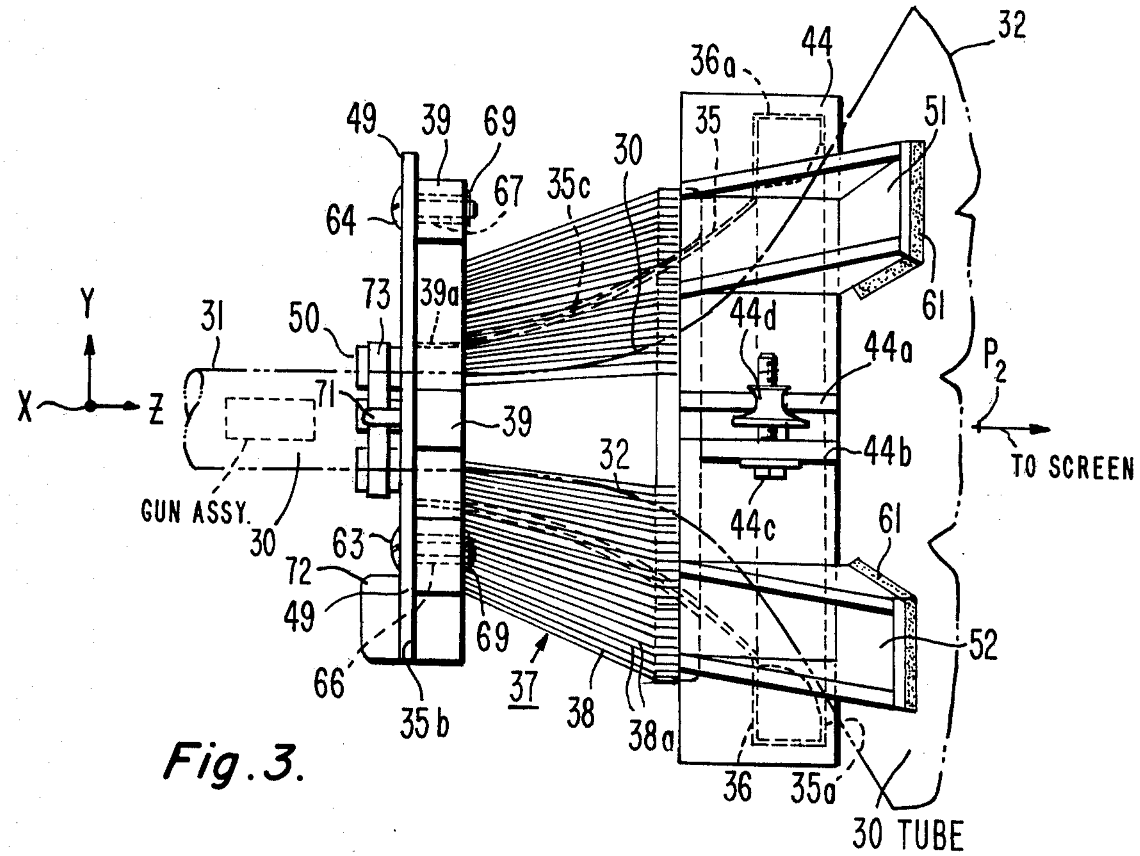
FIG. 3 is a side elevation view of the yoke mounting apparatus according to one embodiment of the present invention.
Figure 4:
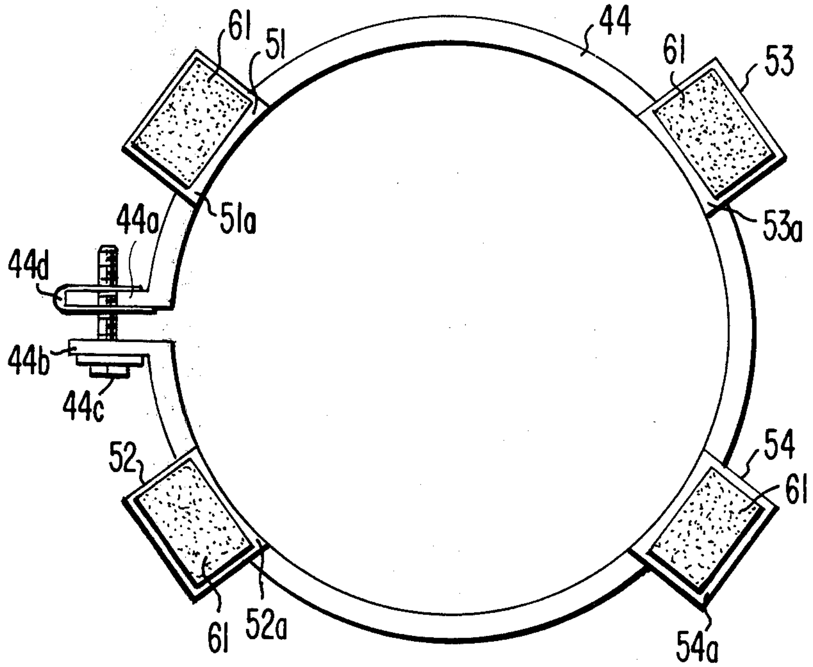
FIG. 4 is a sketch of the mounting ring alone in FIG. 3 as viewed from the screen end.
Figure 5:
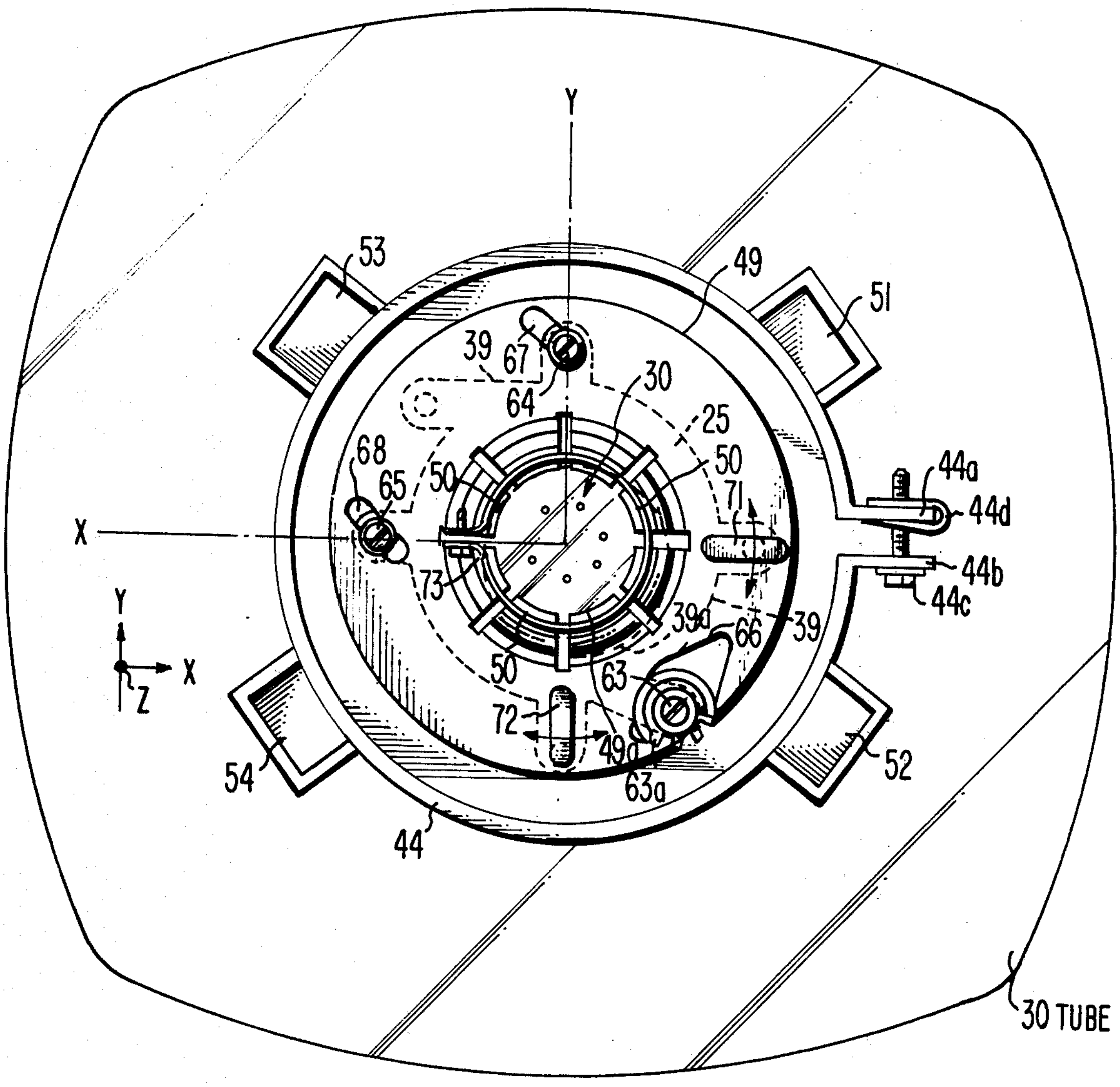
FIG. 5 is a rear view (behind the TV screen) of the mounting assembly in FIG. 3

Referring to FIG. 3, there is illustrated a portion of a rectangular color television picture tube 30 of the type utilizing three horizontal in-line beams and a phosphor element viewing screen utilizing a pattern of vertical color phosphor strips. The tube 30 has a screen portion with the repeated pattern of blue, red and green phosphor strips, a neck portion 31 including an electron gun assembly for producing three in-line beams and a flared portion 32 between the neck portion 31 and screen portion. A deflection yoke 37 is mounted to and around the neck portion 31 and flared portion 32 of the tube 30. See FIGS. 3 thru 6. The yoke 37 includes a funnel shaped ferrite core 38 with wires 38*a* wrapped therearound for forming toroidal vertical deflection coils for providing vertical deflection of the beams, and a funnel shaped insulator 35. The funnel shaped insulator 35 extends through the core 38 along section 35*c* of insulator 35 and beyond to a large annular flange 36 at one forward or screen end 35*a* and a smaller flange 39 at the back or narrow neck end 35*b*. The funnel shaped insulator 35 has conductive wires (not shown) in the well known saddle configuration (see for example FIG. 2 of U.S. Pat. No. 3,488,541 of Barbin) on the tube side (inside surface) of the insulator 35 forming a pair of horizontal deflection coils for providing horizontal deflection of the beams. The funnel shaped insulator 35 separates the core 38 and vertical coil wires 38*a* from the horizontal deflection (saddle) coil wires (not shown) on the inner surface of the insulator. The annular insulator flange 36 of yoke 37 is fitted inside a mounting ring 44 type of support frame with the axis of the flange 36 coaxial with the axis of the yoke 37 and coaxial with the mounting ring 44. The mounting ring 44 is of insulator plastic material and as illustrated in FIGS. 4 and 5 is a split ring-shaped member having four plastic support fingers 51 thru 54 which are integral with the mounting ring 44. The fingers 51 thru 54 extend generally forwardly and radially from the ring 44 with the ring mounted to the tube along the diagonals of the somewhat rectangular picture tube as shown in FIG. 5. The free ends of each of the fingers 51 thru 54 are at an angle so that they match the angle of the taper of the flared portion 32 of the tube 30.

Figure 6:
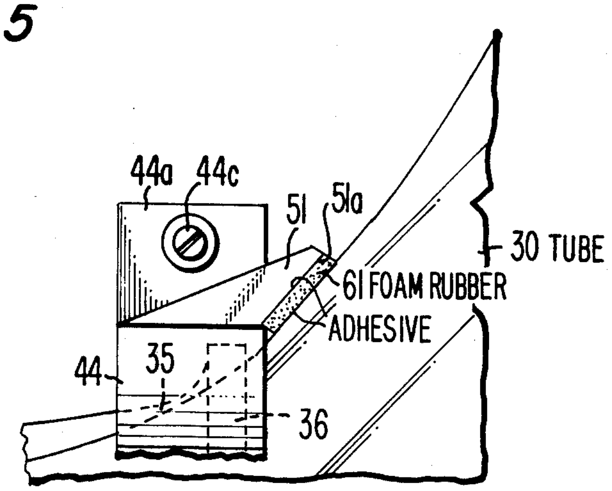
FIG. 6 is a sketch illustrating in detail how one of the fingers on the mounting ring of FIG. 3 is fixed to the picture tube.

As illustrated in FIG. 6, the end 51*a* of finger 51 matches the flare of tube 30. A relatively thick pad 61 of spongy foam rubber material is adhesively fixed between the ends of each of the support fingers 51 thru 54 and the flared portion 12 of the tube 30 as illustrated, for example, in FIG. 6. The pad 61 serves to provide a cushion between the fingers 51 thru 54 and the tube 30 and to allow pivoting of the yoke 37 relative to the tube 30 where the pivot point $P_2$ is near the wider flanged end 35*a*. The pads 61 provide a flexible support of the front end of the yoke to the tube.

The mounting ring 44 clamps about the annular insulator flange 36. This clamping is achieved by a split in the mounting ring 44 with tabs 44*a* and 44*b* extending at the ends thereof and a screw 44*c* passed through the tabs 44*a* and 44*b* and speed nut 44*d* permitting, when the screw 44*c* is tightened, a reduced diameter of the mounting ring and clamping of the mounting ring 44 about the annular insulator flange 36. The inner surface of mounting ring 44 has a substantially uniform diameter along the longitudinal Z-axis of the mounting ring. The outer surface 36*a* of the annular flange 36 has a substantially uniform diameter along the Z axis so that the mounting ring 44 when clamping touches a substantial surface 36*a* of the flange 36. The length of the mounting ring 44 along the Z-axis is substantially longer than flange 36 so that as the yoke 37 is adjusted for purity, the flange 36 slides along the mounting ring 44.

At the back end 35*b* (end away from the screen) of the funnel shaped insulator 35, there is the second smaller diameter insulator flange 39. The core 38 is fixed at its rear to this flange 39 and at its front to flange 36. The opening 39*a* in the smaller flange 39 is substantially smaller than the opening at end 35*a* but is larger than the diameter of the neck portion 31 of the tube 30 to permit the neck portion 31 of the tube to extend through the yoke 37 and the yoke to be moved relative to the neck of the tube in both X and Y directions (horizontal and vertical) to adjust for convergence. A neck cap 49 with a centered aperture 49*a*. (See FIG. 5) about the size of the neck portion of said tube is passed over the neck portion of the tube and is positioned adjacent the smaller flange 39. A series of flexible plastic fingers 50 extend about the center aperture 49*a* to flexibly hold about the neck 31 of the picture tube 30 in the X and Y directions. In the neck cap 49 are three slots. One slot 66 is a large diamond shaped aperture. The other two slots 67 and 68 have their longitudinal axis generally parallel to each other. The slots 67 and 68 however are slightly curved with the ends of the slots 67 and 68 turning toward each other. The longitudinal axis of the slot 67 crosses the upper vertical Y-axis of the end cap 49 at an approximate 45° angle. The slot 68 lies along the horizontal X-axis 90° of arc from slot 67 and the longitudinal axis of slot 68 makes about a 45° angle with the X-axis on the left side thereof (facing the end cap at the rear end of the yoke.) See FIG. 5. Screws 63, 64 and 65 are placed through the respective slots 66, 67 and 68 and attach the neck cap 49 to the flange 39. The screw 63 is much smaller than the size of the diamond shape aperture of slot 66. The screw 63 is placed through a washer 63*a* of larger diameter than the maximum width of slot 66. The screws 63, 64 and 65 are passed through end cap 49 at slots 66, 67 and 68 respectively and through apertures in the end flange 39 to threaded inserts 69 on the screen end of the flange 39. See FIG. 5.

In attaching the yoke, the yoke 37 is passed over the neck portion 31 and the flared portion 32 of the tube 30. The mounting ring 44 is passed over the yoke 37 and is moved as far forward as possible and the ends of the fingers 51 thru 54 are adhered to the flared end 32 of tube 30 via the foam rubber pads 61. The relatively thick pads 61 of spongy foam rubber material is therefore spaced between the fingers 51 thru 54 extending from the ring 44 and the tube 30. See for example FIG. 6. The annular insulator flange 36 is slid inside the mounting ring 44 when the yoke 37 is slid forward and back in a Z-direction to adjust for purity. The yoke 37 during this operation is loosely held in the transverse X and Y directions by the mounting ring 44 and by the fingers 50 in the end cap 49. Once purity is obtained, the yoke 37 is then rotated by rotating the flange 36 inside the mounting ring 44 to align the raster so that picture is properly oriented. Once purity adjustment is made and the picture is properly oriented, the screw 44c is turned to tighten the mounting ring 44 around the yoke flange 36 securing the flange 36 to the mounting ring 44 and to the tube 30. To adjust for convergence, the yoke 37 is tilted from the rear flange 39 with the pivot point being on the tube axis near the insulator flange 36 indicated as $P_2$ in FIG. 3. The back flange 39 is moved in the X and Y directions by tightening one of the screws 64 and 65 in the slots 67 and 68 and loosening the other screw while screw 63 is loose. The slight tilting movement taking place in the forward flange 36 when tilting the yoke 37 is taken up by the pads 61 of spongy material at the ends of each of the fingers 51 through 54. To adjust for convergence by tilting the yoke in the vertical or Y-directions, the horizontal screw 65 is tightened and the screws 63 and 64 are loose. Upward and downward force is applied between the neck cap 49 and the yoke 37 at a protruding member 71 located opposite the tight screw 65. The tight screw 65 acts as a pivot point for the rotation of the neck cap 49 relative to the yoke. The neck cap 49 also rotates about the tube neck causing screw 65 to raise or lower the flange 39 and the yoke is tilted in the vertical direction. When the desired location is reached in the vertical direction, screw 64 is tightened and screw 65 is loosened and force is applied in the horizontal direction at a protruding member 72 in order to move the yoke in a direction generally orthogonal to the first movement. Once convergence is achieved, the screw 65 is tightened and screw 63 is tightened. The diamond shaped aperture 66 allows any combination of movements of slots 67 and 68. Once convergence is made, the neck of the tube is clamped to the fingers 50 by means of the clamp 73 as seen in FIG. 3.

As can be seen, the above described mount allows the yoke 37 to include longer deflection coils for greater deflection sensitivity by permitting the yoke to be placed further forward than in the prior art. After achieving purity and clamping the forward end 35*a* of the yoke to the tube 30 using the ring 44, the rear flange 39 is then moved in the X and Y directions to tilt the narrower end of the yoke, the pivot point for the yoke being located on the tube axis in front of the forward end of the yoke. The spongy foam rubber material of the pads 61 at the ends of the fingers allow the slight flexing movement at the screen end yoke when tilting is done to adjust convergence. Although the inside diameter of the rear portion of the yoke must be relatively larger than the diameter of the neck to allow movement in the transverse X and Y direction the longer deflection coils still increase the overall deflection sensitivity.

What is claimed is:

1. A deflection yoke mount for a television picture tube including a narrow neck portion, a screen portion and a flared portion extending therebetween wherein the yoke is generally a funnel shaped structure, comprising:

means coupled to one end of said yoke for mounting said one end of said yoke about said tube;

means coupled to the other end of said yoke for adjustably mounting said other end of said yoke about said tube, said adjustable mounting means including a slotted neck cap having an aperture therein adapted to hold about the neck of said tube;

said neck cap being fixed to said other end of said yoke by means including screws extending thru slots in the neck cap, said slots being generally 90° of arc from each other and are generally parallel to each other with the ends of the slots curved slightly towards each other such that when one of the screws is tightened and the others are loosened, the neck cap is rotated relative to said other end of said yoke and said neck about a pivot point located at the fixed screw for permitting selective movement of said other end of said yoke relative to said picture tube in a plane substantially orthogonal to the central longitudinal axis of said picture tube.

2. The combination claimed in claim 1 wherein one of said slots lies along the vertical axis of said yoke and the other slot lies along the horizontal axis of the yoke.

3. The combination claimed in claim 2 wherein said neck cap includes a third large diamond shaped aperture.

4. The combination claimed in claim 3 wherein said neck cap aperture has flexible fingers that extend about the periphery thereof to flexibly hold the neck of said tube.

5. A method of mounting a funnel shaped beam deflection yoke relative to an in-line color picture tube comprising an envelope containing a color phosphor screen, an electron gun assembly for projecting a plurality of electron beams toward said screen and a deflection region for said beams, said method comprising:

moving said deflection yoke along the axis of said tube to adjust for purity, fixing the wider end of the yoke to the tube when purity adjustment has been made to permit only slight movement thereof, moving the narrower end of the yoke in any direction generally orthogonal to the axis of the tube to tilt the yoke about a pivot point located forward the wider end of the yoke to achieve substantial convergence of said beams and coincidence of said rasters on said screen, and fixedly attaching said free end of said yoke to said picture tube in said adjusted position.

6. A deflection yoke assembly mount to permit convergence adjustment for an in-line beam type color television picture tube having a narrow neck portion, a screen portion and a flared portion extending between the neck portion and the screen portion wherein the yoke assembly is a generally funnel shaped structure having a narrow aperture end and a wider aperture end, comprising:

means for mounting said yoke assembly about and to said tube near said wider apertured end to pivot about a point located near said wider aperture end of said yoke, and means for adjustably mounting the narrow aperture end of said yoke about said tube to tilt the yoke axis in any direction about said pivot point when adjusting for convergence, said adjustable mounting means including a slotted neck cap having an aperture therein adapted to hold about the neck of said tube;

said neck cap being fixed to said narrow end of said yoke assembly by fastening means extending thru slots in the neck cap, said slots being configured and oriented relative to each other such that when one of the fastening means is fixed and another is loosened, the neck cap is rotated relative to said narrow end of said yoke assembly and said neck about a pivot point located at said fixed fastening means for permitting generally linear movement of said narrow end of said yoke assembly relative to said picture tube in first opposite directions in a plane substantially orthogonal to the central longitudinal axis of said picture tube and when said one of said fastening means is loosened and another of said fastening means is fixed, rotation of said neck cap results in generally linear movement of said narrow end of said yoke assembly in second opposite directions which are substantially perpendicular to said first directions.

7. The combination claimed in claim 6 wherein said slots are generally 90° of arc from each other and are generally parallel to each other with the ends of the slots curved slightly towards each other.

8. The combination claimed in claim 7 wherein one of said slots lies along the vertical axis of said yoke and the other slot lies along the horizontal axis of the yoke.

9. The combination claimed in claim 8 wherein said neck cap includes a third large diamond shaped aperture.

10. The combination claimed in claim 9 wherein said neck cap aperture has flexible fingers that extend about the periphery thereof to flexibly hold the neck of said tube.

* * * * *